Figure 1:
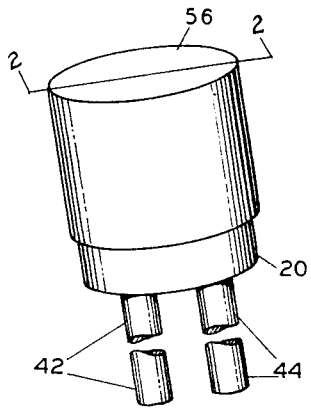

Sept. 3, 1957     M. R. SMITH     2,805,304

PROTECTORS FOR ELECTRIC CIRCUITS

Filed July 11, 1955

INVENTOR.
Martin R. Smith
BY Rey Eilers
ATTORNEY.

United States Patent Office 2,805,304
Patented Sept. 3, 1957

2,805,304

PROTECTORS FOR ELECTRIC CIRCUITS

Martin R. Smith, St. Louis, Mo., assignor to McGraw-Edison Company, a corporation of Delaware Application July 11, 1955, Serial No. 521,118

21 Claims. (Cl. 200—142)

This invention relates to improvements in protectors for electric circuits. More particularly, this invention relates to improvements in thermally responsive circuit-breaking devices.

It is therefore an object of the present invention to provide an improved thermally-responsive circuit-breaking device.

It is usually desirable and advisable to protect electrically heated equipment against overheating. One standard and well-recognized method of protecting such equipment against overheating contemplates the use of thermally responsive circuit-breaking devices in series with the electrical heating elements of such equipment. Whenever the electrically heated equipment tends to become overheated, the circuit-breaking devices will open the circuits to those heating elements and thereby prevent further heating of that equipment. The thermally responsive circuit-breaking device of the present invention is adapted to be connected in series with the electrical heating element of an electrically heated unit to protect that unit against overheating. It is therefor an object of the present invention to provide an improved thermally responsive circuit-breaking device that can be connected in series with the electrical heating element of an electrically heated unit to protect that unit against overheating.

To be acceptable, a thermally responsive circuit-breaking device must be certain and sure in operation. This means that such a device must be able to open the circuit without maintaining an electric arc. The present invention assures certain and sure breaking of the circuit without the maintenance of an electric arc by providing two arcing gaps in series. The provision of two arcing gaps, rather than just one such gap, makes it possible for each of the arcing gaps to be shorter than the solitary arcing gap which they replace. In fact, each of those arcing gaps can be one half the length of that gap. By reducing the lengths of the two arcing gaps, and by having one movable element open both of those gaps, the present invention makes it possible to move that movable element just a short distance and still provide certain and sure opening of the circuit. The short movement of the movable element is desirable since it reduces the required overall dimensions of the circuit-breaking device. It is It is therefore an object of the present invention to provide a thermally responsive circuit-breaking device that has two series-connected arcing gaps which are opened by the movement of one movable element.

The movable element of the present invention is normally held against movement by two masses of heat-softenable material. The movable element and the two masses of heat softenable material are so arranged that the movable element cannot move until both of those masses of heat softenable material lose their holding power. Consequently, both arcing gaps are opened simultaneously; and such an arrangement minimizes arcing. It is therefore an abject of the present invention to provide a thermally responsive circuit-breaking device wherein two arcing gaps are provided and wherein those gaps are opened simultaneously.

The thermally responsive circuit-breaking device of the present invention further minimizes arcing by enclosing the arcing gaps between closely adjacent walls of non-conducting material. Those walls will act to cool any arcs which may form and they will also tend to emit de-ionizing gases in the presence of any such arcs. The combined cooling and deionizing actions of those walls will enable those walls to quickly quench any arcs that may form. It is therefore an object of the present invention to provide a thermally responsive circuit-breaking device wherein the arcing gaps are disposed between closely adjacent walls of non-conducting material.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 2:
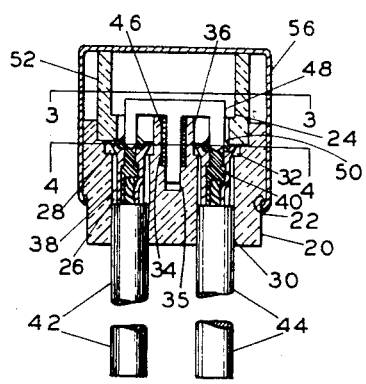
Figure 3:
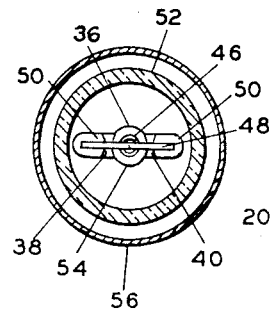
Figures 4, 5, 6, 7:
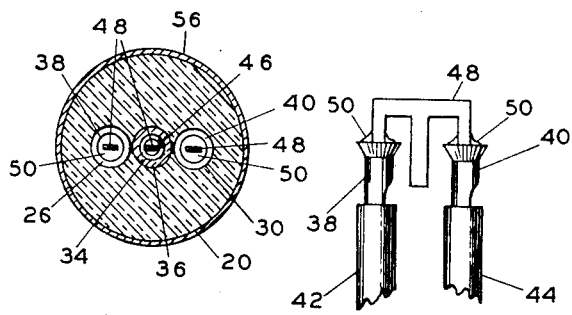
Figures 8, 9, 10, 11, 12:
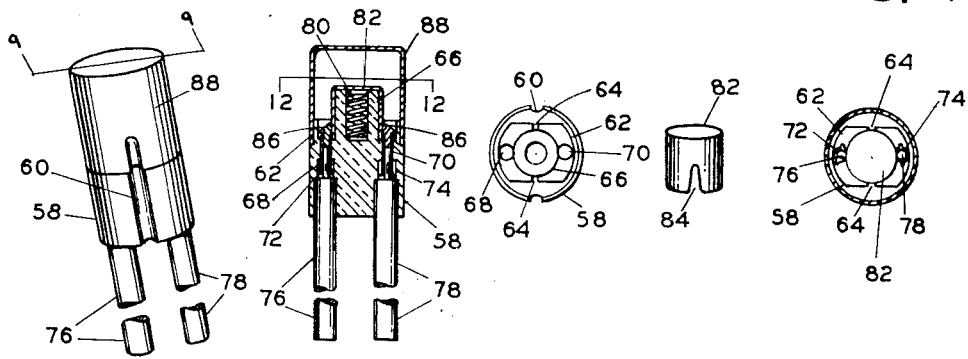

In the drawing, Fig. 1 is a partially-broken perspective view of one form of thermally responsive circuit-breaking device that is made in accordance with the principles and teachings of the present invention, Fig. 2 is a cross sectional view of the circuit-breaking device of Fig. 1, and it is taken along the plane indicated by the line 2—2 in Fig. 1, Fig. 3 is a sectional plan view of the circuit-breaking device of Figs. 1 and 2, and it is taken along the plane indicated by the line 3—3 in Fig. 2, Fig. 4 is another sectional plan view of the circuit-breaking device of Figs. 1 and 2, and it is taken along the plane indicated by the line 4—4 in Fig. 2, Fig. 5 is a side elevational view of the movable element, the terminals and parts of the lead-in conductors of the circuit-breaking device of Figs. 1 and 2, Fig. 6 is a side elevational view of the movable element of the circuit-breaking device of Figs. 1 and 2, Fig. 7 is a plan view of the spacer of the circuit-breaking device of Figs. 1 and 2, Fig. 8 is a partially-broken perspective view of another form of thermally responsive circuit-breaking device that is made in accordance with the principles and teachings of the present invention, Fig. 9 is a sectional view of the circuit-breaking device of Fig. 8, and it is taken along the plane indicated by the line 9—9 in Fig. 8, Fig. 10 is a plan view of the body of the circuit-breaking device of Figs. 8 and 9, Fig. 11 is a perspective view of the movable element of the circuit-breaking device of Figs. 8 and 9, and Fig. 12 is a plan view of the circuit-breaking device of Figs. 8 and 9 with the cover thereof removed.

Referring to the drawing in detail, the numeral 20 denotes a body of electrically insulating material, as for example porcelain, steatite or the like. That body is generally cylindrical in configuration, but it has a shoulder 22 thereon. That shoulder is intermediate the top and bottom faces of the body 20, but it is somewhat closer to the bottom face than it is to the top face. The upper face of the body 20 is provided with a recess 24; and that recess has a diameter which is just slightly less than the diameter of the body 20. Hence that recess is separated from the exterior surface of the body 20 by a thin annular wall.

An elongated bore or recess 26 extends downwardly through the body 20 from the recess 24 to the bottom face of that body. That bore has a short, larger diameter section 28 at the upper end thereof. The section 28 is immediately adjacent the recess 24. A second elongated bore or recess 30, similar to the bore 26, extends downwardly from the recess 24 to the bottom face of the body 20. That second bore has a short, larger diameter section 32 at the upper end thereof; and the section 32 is immediately adjacent the recess 24. A recess 34 extends downwardly into the body 20 from the recess 24, but it terminates short of the bottom face of that body. This recess is aligned with, and is parallel to, the bores 26 and 30. A smaller diameter recess 35 is contiguous with the recess 34, and it extends even farther into the body 20. A shoulder is defined within the body 20 at the adjacent ends of the recesses 34 and 35.

An annular wall 36 projects upwardly from the bottom of the recess 24; and that wall closely encircles, and defines a continuation of, the recess 34. That wall acts as a barrier between the areas immediately above the upper ends of the bores 26 and 30.

The numeral 38 denotes a terminal of electrically conducting material which is of tubular form but which has a flared upper end. A similar terminal of electrically conducting material is denoted by the numeral 40. The terminal 38 is disposable within the bore 28 and the upper end of the bore 26, while the terminal 40 is disposable within the bore 32 and the upper end of the bore 30. A lead-in conductor 42 extends into the lower end of the terminal 38, and it is held in that lower end by crimping that lower end of terminal 38 onto that conductor. Similarly, a lead-in conductor 44 extends into the lower end of the terminal 40, and it is held in that lower end by crimping that lower end of terminal 40 onto that conductor. The insertion of the lead-in conductors, and the crimping of the lower ends of the terminals 38 and 40 into those conductors effectively close the lower ends of those terminals. Hence, those terminals, in effect, have recesses at the upper ends thereof.

A helical compression spring 46 is dimensioned to extend into the extension of recess 34 defined by annular wall 36 and to extend into the recess 34 defined by the body 20. That spring will have an outside diameter which is appreciably smaller than the inside diameters of the recess 34 and its extension so that spring can move freely within that recess and that extension. The inside diameter of the spring 46 is large enough to enable that spring to freely receive the center bar of a generally E-shaped stiff movable element 48 of electrically conducting material. The middle bar of the movable element 48 is actually longer than the upper and lower bars of that element, and to be truly E-shaped that movable element should have a short middle; but despite this variation, the movable element 48 has the general configuration of an E.

The center bar of the movable element 48 extends all the way through the recess 34 and extends into the smaller diameter recess 35. The spring 46, will, however, not be able to extend into the recess 35; instead its lowermost turn will rest upon and be held by the shoulder between the recess 34 and the smaller diameter recess 35. The upper end of the spring 46 bears against the staff of the E-shaped movable element 48. Hence, that spring biases the movable element 48 for movement upwardly away from the bottom of the recess 24.

The upper and lower bars of the E-shaped movable element 48 normally extend into the recesses defined by the upper ends of the terminals 38 and 40. The inner diameters of those recesses in those terminals are large enough to freely accommodate those upper and lower bars of the movable element 48. Consequently, that movable element can readily move relative to those terminals under the action of the spring 46.

Two masses of heat softenable material 50, which will usually be solder that melts at a temperature below five hundred degrees Fahrenheit, are used to normally hold the upper and lower bars of the E-shaped movable element 48 within the recesses in the upper ends of the terminals 38 and 40. Those masses of heat softenable material will extend along those portions of the top and bottom bars of the E-shaped movable element 48 which are coextensive with the upper ends of the terminals 38 and 40. In doing so, those masses will assure positive and certain physical engagements and electrical connections between that movable element and those terminals. The two masses of heat softenable material 50 will preferably have the same softening temperature; and each of those masses will resist the movement of the particular bar of the movable element 48 which it engages. This resistance to movement will couple with the stiffness of the movable element 48 to prevent movement of any portion of the element 48 until both of the masses of heat softenable material have softened.

The two masses of heat softenable material 50 extend short distances above the upper ends of the terminals 38 and 40. The upwardly extending portions of those masses are generally conical, as emphasized particularly in Fig. 5.

The numeral 52 denotes a spacer which can be said to consist of a generally flat plate and an upwardly extending annular wall. An elongated slot 54 is provided in the generally flat plate of the spacer 52, and that slot has two concave portions intermediate the ends thereof. Those concave portions are opposite each other, and they are dimensioned to engage the exterior of the annular wall 36 on the body 20. The slot 54 is wide enough to readily accommodate the top and bottom bars of the movable element 48, and it therefore permits free movement of that element relative to that spacer.

The slot 54 in the spacer 52 is narrower than the flared upper ends of the terminals 38 and 40, and hence the portions of spacer 52 which define that slot can overlie the flared ends of those terminals. Moreover, the portions of spacer 52 which define the slot 54 can also overlie portions of the conical upper ends of the two masses of heat softenable material 50. The slot 54 in the spacer 52 will be telescoped downwardly over the staff of the E-shaped movable element 48 during the assembly of the circuit-breaking device of the present invention; and when that slot closely approaches the bottom of the recess 24, the portions of spacer 52 which define the slot 54 will engage and be moved circumferentially by the conical upper portions of the masses of heat softenable material 50. When the spacer 52 comes to rest closely adjacent the bottom of the recess 24, the opposite ends of the slot 54 will be centered over the terminals 38 and 40 and will be overlying the flared upper ends of those terminals.

A generally cup-shaped cover 56 is provided for the circuit-breaking device of Figs. 1 and 2, and that cover will telescope downwardly over the outer surface of the body 20. During the assembly of the circuit-breaking device, the cover 56 is moved downwardly along that outer surface until the inner portion of the closed end of that cover engages the top of the annular wall of spacer 52 and thereby holds the generally flat plate of that spacer immediately adjacent the upper ends of the terminals 38 and 40. At such time, the bottom edge of the skirt of the cover 56 is crimped or rolled into intimate engagement with the shoulder 22, as emphasized particularly in Fig. 2. The elements of the circuit-breaking device are protected from injury by the cover 56; and passersby are protected from electrical shocks, because the cover and body enclose all of the uninsulated "live" elements of the circuit-breaking devices.

The cover 56 is the only element of the thermally responsive circuit-breaking device of Figs. 1 and 2 which is permanently connected to the body 20. All of the other elements of that device can be readily inserted in bores or recesses of that body and can also be readily separated from those bores or recesses. This is helpful in reducing the costs of assembling the circuit-breaking device of the present invention.

The normal position of the elements of the thermally responsive circuit-breaking device of Figs. 1–7 is shown in Fig. 2. Current will pass through the lead-in conductor 42, through the terminal 38, through the first of the two masses of heat softenable material 50, through the bottom bar and staff and top bar of the movable element 48, through the second of the two masses of heat softenable material 50, through the terminal 40, and then through the lead-in conductor 44. As long as the temperature of the heat softenable material 50 is at levels at which that material can hold the movable element 48 against movement, the spring 46 will be unable to move that movable element to circuit-opening position, and the thermally responsive circuit-breaking device of the present invention will supply current to the electrically heated unit. However, when the temperature of that unit rises above the normal upper temperature limit of that unit, and is then maintained above that limit for an appreciable period of time, the heat softenable material 50 can lose its holding power and permit the movable element 48 to move upwardly under the action of the spring 46. The cover 56 is dimensioned so the closed end thereof is spaced from the staff of the E-shaped movable element 48 a distance great enough to permit that movable element to move wholly out of engagement with the terminals 38 and 40. Moreover, that spacing is sufficient to enable two short arcing gaps to be created between the terminals 38 and 40 and the upper and lower bars of the movable element 48; and those arcing gaps will quickly extinguish any arcs that might form.

The walls of the slot 54 in the spacer 52 are closely adjacent the arcing gaps formed by the terminals 38 and 40 and the upper and lower bars of the E-shaped movable element 48. Those walls will help to quench any arcs that might form, as by cooling and de-ionizing those arcs. The use of the two arcing gaps and the provision of the walls closely adjacent those gaps make the operation of the thermally responsive circuit-breaking device of the present invention sure and certain.

The annular wall 36 will serve as a barrier between the upper ends of the terminals 38 and 40 and the masses of heat softenable material held by those terminals. Hence it will coact with the walls of slot 54 of spacer 52 to keep molten heat softenable material from bridging the terminals 38 and 40 prior to, during, or subsequent to circuit-breaking movement of the E-shaped element 48.

The circuit-breaking device provided by the present invention can be made to open the circuits at different temperatures, as by using heat softenable materials that soften at different temperatures. This enables the said device to protect many different kinds of electrically heated units by just selecting different heat softenable materials.

Figs. 8–12 of the drawing disclose another form of thermally responsive circuit-breaking device provided by the present invention; and in that form, the body is denoted by the numeral 58. That body is generally cylindrical, but it has two axially-extending grooves 60 in the surface thereof. Those grooves are semi-cylindrical in cross section.

A generally annular wall 62 is formed on the upper end of the body 58, and that wall projects upwardly beyond that upper end to define an external shoulder and an internal recess. The wall 62 is not of constant thickness but instead has two chord-like portions at the opposite ends of a diameter of the body 58. A pair of ribs 64 extend inwardly, along that diameter, from the chord-like portions of the wall 62; and those ribs extend to an annular wall 66 which defines a small diameter recess. That small diameter recess is located at the geometric center of the body 58. The wall 62 coacts with the ribs 64 and the annular wall 66 to divide the large recess, at the upper end of the body 58, into two generally semi-circular recesses.

A bore or recess 68 extends downwardly from one of those semi-circular recesses to the bottom face of the body 58. A similar bore or recess 70 extends downwardly from the other semi-circular recess to the bottom face of the body 58. The two bores are spaced apart from each other and from the recess defined by the annular wall 66, but the axes of the bores 68 and 70 are aligned with and parallel to the axis of the recess defined by the wall 66.

The bore 68 receives a sleeve 72 of electrically conducting material; and that sleeve constitutes one terminal of the thermally responsive circuit-breaking device of Figs. 8–12. A similar sleeve 74 is disposed within the bore 70 and it constitutes the second terminal of the circuit-breaking device. The upper ends of the sleeves 72 and 74 are telescoped upwardly through those bores until the tops of those sleeves are spaced a short distance above the bottoms of the semi-circular recesses in the upper end of the body 58. Thereafter, those upper ends of those sleeves are staked or otherwise locked in position relative to the body 58.

The lower ends of the sleeves 72 and 74 receive the upper ends of lead-in conductors 76 and 78 respectively. The lead-in conductors 76 and 78 will be suitably secured to the terminals 72 and 74 as by crimping the lower ends of those terminals onto the upper ends of those conductors. The lower ends of those conductors can be connected in the circuit that controls the heating of an electrically heated unit.

The upper ends of the terminals 72 and 74 are immediately adjacent the skirt of the movable element 82 which is preferably made in the form of a cup. That cup has vertically directed slots 84 in the side wall thereof, and those slots are at the opposite ends of a diameter of that cup. The cup-shaped movable element 82 will be positioned so the slots 84 thereof are in register with and can telescope down over the ribs 64 at the upper end of the body 58. As the slots 84 of the movable member 82 are telescoped downwardly over the ribs 64, the closed end of that element compresses a helical compression spring 80 which is mounted in the recess defined by the annular wall 66.

Two masses of heat softenable material 86, usually solder that melts at temperatures below five hundred degrees Fahrenheit, engage the movable element 82 and the terminals 72 and 74. Those masses of heat softenable material normally hold the movable element 82 in electrically conducting relation with the terminals 72 and 74, and thus in electrically conducting relation with the lead-in conductors 76 and 78; but those masses can respond to heat from the electrically heated unit, that is being protected, to soften and thereby release that movable member. When this occurs, that movable element will move upwardly under the influence of the spring 80 and form two arcing gaps at the terminals 72 and 74. Those gaps will quickly quench any arcs that might form.

The annular wall 66 coacts with the ribs 64 to form a barrier between the terminals 72 and 74 and the masses of heat softenable material 86 on those terminals. As a result, that wall and those ribs keep molten heat softenable material from bridging those terminals prior to, during and subsequent to circuit-breaking movement of the element 82.

A cup-shaped cover 88 is provided for the body 58, and the closed end of that cover is spaced from the movable member 82 a distance sufficient to permit that movable element to move and form the two arcing gaps at the terminals 72 and 74. This cover will be suitably secured to the body 58 by having portions of its skirt crimped into the recesses 60 of that body. That cover will protect the parts of the device from injury and will protect passersby from shocks.

The normal position of the elements of the thermally responsive circuit-breaking device of Figs. 8–12 is shown in Fig 9. Current flows through the lead-in conductor 76, through the terminal 72, through the first mass of heat softenable material 86 to the movable element 82, through that movable element, through the second mass of heat softenable material 86, through the terminal 70, and then through the lead-in conductor 78. In this way, the circuit-breaking device provides a continuous flow of current as long as the heat softenable material 86 is in its normal condition. However, when that heat softenable material softens, under the influence of heat from an excessively-hot electrically heated unit, the movable element 82 will be freed for movement upwardly under the action of spring 80. In moving upwardly, the movable element will create two arcing gaps at the terminals 72 and 74; and the resulting double break will assure extinction of any arcs that might form.

In both forms of thermally responsive circuit-breaking device provided by the present invention, the movable element is rigid and cannot move appreciably until both of the spaced-apart masses of heat softenable material release that movable element. This means that the two arcing gaps are opened simultaneously. In this way, a truly effective double-break is attained; and arcing is minimized.

Whereas two preferred embodiments of the present invention have been shown and described in the drawing and accompanying description it should be apparent to those skilled in the art that various changes may be made in the form of the invention without affecting the scope thereof.

What I claim is:

1. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, said movable element having a portion thereof disposable in electrically conducting relation with one of said electrically conducting terminals and having a second portion thereof disposable in electrically conducting relation with a second of said electrically conducting terminals, a plate of electrically insulating material that is perforated to receive said portions of said movable element and that is dimensioned to provide spaces between said portions of said movable element and adjacent portions of said plate whereby said movable element can move freely relative to said plate, said portions of said plate overlying portion of said electrically conducting terminals, and heat softenable material that normally holds the first said portion of said movable element in electrical engagement with the first said terminal and holds said second portion of said movable element in electrical engagement with said second terminal, said heat softenable material being generally conical in part to guide said portions of said plate into position overlying said portions of said terminals and to space said portions of said plate from said portions of said movable element, said movable element being biased for movement bodily away from said electrically conducting terminals to interrupt said electrical circuit whenever said heat softenable material loses its holding power, said heat softenable material holding said portions of said movable element in said electrical engagement and also holding said movable element against said bodily movement until both of said portions of said movable element can move out of said electrical engagements and interrupt said electrical circuit, whereby a double break is provided for said circuit, said portions of said plate defining a narrow space with non-conducting walls that help quench any arcs that might form as said portions of said movable element move away from said terminals.

2. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, said movable element having a portion thereof disposable in electrically conducting relation with one of said electrically conducting terminals and having a second portion thereof disposable in electrically conducting relation with a second of said electrically conducting terminals, a plate of electrically insulating material that is perforated to receive said portions of said movable element and that is dimensioned to provide spaces between said portions of said movable element and adjacent portions of said plate whereby said movable element can move freely relative to said plate, said portions of said plate overlying portions of said electrically conducting terminals, and heat softenable material that normally holds the first said portion of said movable element in electrical engagement with the first said terminal and holds said second portion of said movable element in electrical engagement with said second terminal, said heat softenable material being generally conical in part to guide said portions of said plate into position overlying said portions of said terminals and to space said portions of said plate from said portions of said movable element, said movable element being biased for movement bodily away from said electrically conducting terminals to interrupt said electrical circuit whenever said heat softenable material loses its holding power, said heat softenable material holding said portions of said movable element in said electrical engagement and also holding said movable element against said bodily movement until both of said portions of said movable element can move out of said electrical engagements and interrupt said electrical circuit, whereby a double break is provided for said circuit.

3. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, said electrically conducting terminals being tubular and receiving lead-in conductors and said portions of said movable element and said heat softenable material, said lead-in conductors and said portions of said movable element extending into opposite ends of said electrically conducting terminals.

4. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, said electrically conducting terminals being tubular and receiving lead-in conductors and said portions of said movable element and said heat softenable material.

5. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, said portions of said movable element being at least partially coextensive with said electrically conducting terminals, said heat softenable material engaging and holding said coextensive portions of said movable element and of said terminals throughout substantially the full lengths of said coextensive portions.

6. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and electrically conducting heat softenable material that engages and normally holds one portion of said movable element in electrical engagement with one of said terminals and that engages and normally holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, said movable element being stiff and being substantially resistant to flexing during said bodily movement.

7. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, said electrically conducting terminals having recesses therein, said portions of said movable element extending into said recesses of said electrically conducting terminals, at least two portions of said heat softenable material being disposed in and engaging the walls of said recesses in said electrically conducting terminals and engaging said portions of said movable element.

8. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and electrically conducting heat softenable material that engages and normally holds one portion of said movable element in electrical engagement with one of said terminals and that engages and normally holds another portion of said movable element in electrical engagement with another of said terminals, and a spring that biases said movable element for movement bodily away from said electrically conducting terminals to interrupt said electrical circuit whenever said heat softenable material loses its holding power, said heat softenable material holding said portions in said electrical engagement and holding said movable element against said bodily movement until both of said portions can move out of said electrical engagements and interrupt said electrical circuit, whereby a double break is provided for said circuit.

9. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and electrically conducting heat softenable material that engages and normally holds one portion of said movable element in electrical engagement with one of said terminals and that engages and normally holds another portion of said movable element in electrical engagement with another of said terminals, said portions of said movable element being spaced apart from each other a distance comparable to the spacing between said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit.

10. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and electrically conducting heat softenable material that engages and normally holds one portion of said movable element in electrical engagement with one of said terminals and that engages and normally holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit.

11. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a bridging element of electrically conducting material, and electrically conducting heat softenable material that engages and normally holds one portion of said bridging element in electrical engagement with one of said terminals and that engages and normally holds another portion of said bridging element in electrical engagement with another of said terminals, said portions of said bridging element being biased away from said electrically conducting terminals to interrupt said electrical circuit whenever said heat softenable material loses its holding power, said heat softenable material holding said portions in said electrical engagements until both of said portions can move out of said electrical engagements and interrupt said electrical circuit, whereby a double break is provided for said circuit.

12. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, heat softenable material that normally holds one portion of said movable element in electrical engagement with one of said terminals and holds another portion of said movable element in electrical engagement with another of said terminals, a spring that biases said movable element for movement bodily away from said electrically conducting terminals to interrupt said electrical circuit whenever said heat softenable material loses its holding power, and a barrier of electrically insulating material disposed between said terminals and said portions of said movable element to keep softened heat softenable material from flowing between and bridging said terminals, said heat softenable material holding said portions in said electrical engagement and holding said movable element against said bodily movement until both of said portions can move out of said electrical engagements and interrupt said electrical circuit, whereby a double break is provided for said circuit.

13. A circuit interrupting device that can interrupt an electrical circuit whenever the temperature of said device reaches a predetermined value and that comprises a body of electrically insulating material, a movable element of electrically conducting material, electrically conducting leads that are carried by said body and that can be connected to said electrical circuit, electrically conducting heat softenable material that engages said movable element and normally holds said movable element in electrically conducting relation with said leads, and a spring that biases said movable element for movement bodily out of said electrically conducting relation to interrupt said electrical circuit whenever said heat softenable material loses its holding power, said movable element being stiff and unyielding during operation of said device.

14. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, and a spring that biases said movable element for movement bodily away from said electrically conducting terminals to interrupt said electrical circuit whenever said heat softenable material loses its holding power, said heat softenable material holding said portions in said electrical engagement and holding said movable element against said bodily movement until both of said portions can move out of said electrical engagements and interrupt said electrical circuit, whereby a double break is provided for said circuit, said spring being a helical compression spring, said movable element having an elongated projection that telescopes into said spring.

15. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, and a spring that biases said movable element for movement bodily away from said electrically conducting terminals to interrupt said electrical circuit whenever said heat softenable material loses its holding power, said heat softenable material holding said portions in said electrical engagement and holding said movable element against said bodily movement until both of said portions can move out of said electrical engagements and interrupt said electrical circuit, whereby a double break is provided for said circuit, said spring being a helical compression spring, said movable element having an elongated projection that telescopes into said spring, said portions of said movable element being elongated and being substantially parallel to said elongated projection.

16. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, and heat softenable material that normally holds one portion of said movable element in electrical engagement with one of said terminals and holds another portion of said movable element in electrical engagement with another of said terminals, and a spring that biases said movable element for movement bodily away from said electrically conducting terminals to interrupt said electrical circuit whenever said heat softenable material loses its holding power, said heat softenable material holding said portions in said electrical engagement and holding said movable element against said bodily movement until both of said portions can move out of said electrical engagements and interrupt said electrical circuit, whereby a double break is provided for said circuit, said spring being a helical compression spring, said movable element having an elongated projection that telescopes into said spring, said portions of said movable element being substantially parallel to said elongated projection, said elongated projection being intermediate said portions of said movable element whereby said movable element has the general configuration of an E.

17. A circuit interrupting device that can interrupt an electrical circuit whenever the temperature of said device reaches a predetermined value and that comprises a body of electrically insulating material, a movable element of electrically conducting material, electrically conducting leads that are carried by said body and that can be connected to said electrical circuit, electrically conducting heat softenable material that engages said movable element and normally holds said movable element in electrically conducting relation with said leads, and a spring that biases said movable element for movement bodily out of said electrically conducting relation to interrupt said electrical circuit whenever said heat softenable material loses its holding power, said movable element being stiff and unyielding during operation of said device, said spring being a helical compression spring, said body having a recess to receive and guide said spring.

18. A circuit interrupting device that can interrupt an electrical circuit whenever the temperature of said device reaches a predetermined value and that comprises a body of electrically insulating material, a movable element of electrically conducting material, electrically conducting leads that are carried by said body and that can be connected to said electrical circuit, electrically conducting heat softenable material that engages said movable element and normally holds said movable element in electrically conducting relation with said leads, and a spring that biases said movable element for movement bodily out of said electrically conducting relation to interrupt said electrical circuit whenever said heat softenable material loses its holding power, said movable element being stiff and unyielding during operation of said device, said spring being a helical compression spring, said body having a recess to receive and guide said spring, said body having recesses to receive said leads, said recesses of said body being aligned and having their axes substantially parallel.

19. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, heat softenable material that normally holds one portion of said movable element in electrical engagement with one of said terminals and holds another portion of said movable element in electrical engagement with another of said terminals, and a spring that biases said movable element for movement bodily away from said electrically conducting terminals to interrupt said electrical circuit whenever said heat softenable material loses it holding power, a cover, and a spacer of electrically insulating material that overlies portions of said terminals and extends to said cover, said spacer holding said cover away from said terminals a distance sufficient to enable said portions of said movable element to move out of engagement with said terminals.

20. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, heat softenable material that normally holds one portion of said movable element in electrical engagement with one of said terminals and holds another portion of said movable element in electrical engagement with another of said terminals, and a spring that biases said movable element for movement bodily away from said electrically conducting terminals to interrupt said electrical circuit whenever said heat softenable material loses its holding power, a cover, and a spacer of electrically insulating material that overlies portions of said terminals and extends to said cover, said spacer holding said cover away from said terminals a distance sufficient to enable said portions of said movable element to move out of engagement with said terminal, said terminals and said movable element and said heat softenable material and said spring being freely separable from said body, said cover acting through said spacer to hold said terminals, and acting through said spacer and terminals and heat softenable material to hold said movable element and said spring, against separation from said body, said cover being fixedly connected to, and being the sole member fixedly connected to, said body.

21. A circuit interrupting device that can interrupt an electrical circuit whenever the temperature of said device reaches a predetermined value and that comprises a body of electrically insulating material, terminals of electrically conducting material that are carried by said body and that can be connected to said electrical circuit, said terminals of electrically conducting material being spaced apart, a movable element of electrically conducting material, heat softenable material that normally holds one portion of said movable element in electrical engagement with one of said terminals and holds another portion of said movable element in electrical engagement with another of said terminals, said movable element being biased for movement bodily away from said electrically conducting terminals to interrupt said electrical circuit whenever said heat softenable material loses its holding power, said heat softenable material holding said portions of said movable element in said electrical engagement and holding said movable element against said bodily movement until both of said portions of said movable element can move out of said electrical engagements and interrupt said electrical circuit, whereby a double break is provided for said circuit, and an element of electrically insulating material that overlies and bears against portions of said terminals to hold said terminals stationary while permitting said movable element to move relative to it and to said teminals whenever said heat softenable material softens.

References Cited in the file of this patent

UNITED STATES PATENTS

| | | |
|---|---|---|
| 2,318,607 | Grant | May 11, 1943 |
| 2,367,639 | Conboy | Jan. 16, 1945 |
| 2,445,529 | Leeds | July 20, 1948 |
| 2,704,314 | Spracher | Mar. 15, 1955 |